United States Patent [19]

Fujita

[11] Patent Number: 5,356,189
[45] Date of Patent: Oct. 18, 1994

[54] METHOD OF LINE LAYING FOR MOORING A PLATFORM

[75] Inventor: Tokume Fujita, Rio de Janeiro, Brazil

[73] Assignee: Petroleo Brasileiro S.A., Rio de Janeiro, Brazil

[21] Appl. No.: 12,348

[22] Filed: Feb. 2, 1993

Related U.S. Application Data

[62] Division of Ser. No. 666,952, Mar. 11, 1991, Pat. No. 5,193,872.

[30] Foreign Application Priority Data

Apr. 18, 1990 [BR] Brazil ............................. PI9001801

[51] Int. Cl.⁵ .................................................. B66C 1/36
[52] U.S. Cl. .................................................. 294/82.11
[58] Field of Search ............. 294/66.1, 75, 82.1–82.13, 294/82.19, 82.2, 82.24, 82.27, 82.31, 82.33; 24/116 R, 132 R; 59/85–89, 93; 114/200, 293, 299; 405/158, 173

[56] References Cited

U.S. PATENT DOCUMENTS

| | | | |
|---|---|---|---|
| 1,181,000 | 4/1916 | Gregg | 294/75 |
| 1,962,130 | 6/1934 | Berkey | 294/82.11 X |
| 2,978,766 | 4/1961 | Arnett | 294/82.19 |
| 2,998,277 | 8/1961 | Himel | 294/75 |
| 3,539,217 | 11/1970 | Skekely | 294/82.33 |
| 3,722,943 | 3/1973 | Kalua | 294/82.2 |
| 4,151,708 | 5/1979 | Smetz | 294/82.19 X |

FOREIGN PATENT DOCUMENTS

| | | | |
|---|---|---|---|
| 8966 | 3/1980 | European Pat. Off. | 294/82.19 |
| 2425400 | 1/1980 | France | 294/82.2 |
| 2485123 | 12/1981 | France | 294/82.19 |
| 2151328 | 7/1985 | United Kingdom | 294/82.11 |

Primary Examiner—Johnny D. Cherry
Attorney, Agent, or Firm—Sughrue, Mion, Zinn, Macpeak & Seas

[57] ABSTRACT

A line laying device for lowering a chain into a body of water wherein the chain is secured at one end to a surface vessel includes a pair of claws pivotally coupled to each other for engaging an intermediate link of the chain. A pivoted lock on one of the claws engages a shoulder on the other claw to maintain the claws in clamping engagement on the link until such time as the chain is lowered to the point where the chain is substantially vertically extended whereupon an adjacent link above the link engaged by the claws will pivot about the link engaged by the claws into engagement with the pivoted locking member to disengage the locking member from the shoulder thereby allowing the claws to be disengaged from the link and retrieved by means of a wire rope secured to one end of one of the claws.

1 Claim, 2 Drawing Sheets

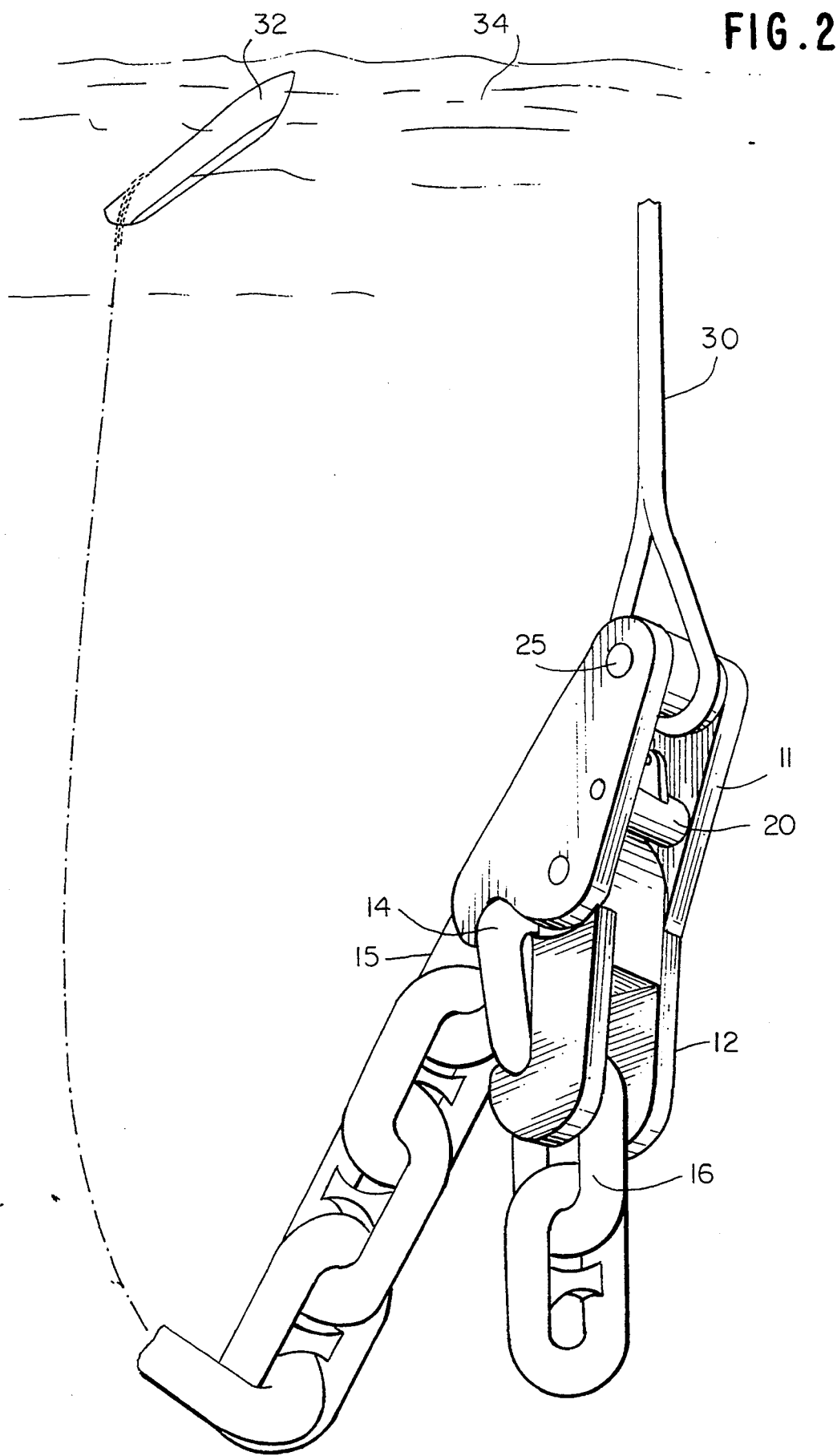

5,356,189

METHOD OF LINE LAYING FOR MOORING A PLATFORM

This is a division of application No 07/666,952 filed Mar. 11, 1991, now U.S. Pat. No. 5,193,872.

FIELD OF THE INVENTION

This invention concerns a line laying device used in a platform mooring system, and also its operating method, which is essential in lowering of line into the sea, down to its sag level, since owing to the great weight Involved, failure to use it might lead to damage, not only to the platform but also to the line itself, while use of it prevents any slipping or drop of line after each platform chain has been fastened to the line laid beforehand.

DESCRIPTION OF PRIOR ART

Known platform mooring systems need a line laying device, because the platform approaches the vessel which holds the line that has been laid beforehand and from it an end of the chain (that on the platform) is transferred to the vessel which latter, by means of an auxiliary winch, places it and holds it down on the deck, and then fastens it to such line laid by it beforehand. After being fastened, the line must be lowered into the sea down to its sag level, without slipping or falling, because if it does, its great weight might damage not only the platform but the line itself.

Published Brazilian Patent Application PI 9000135 of Jan. 15, 1990, belonging to the same applicant, deals with an improved laying device which consists of a support, a sheave with a crown, fixed to such support by a spindle, there being slots in the flanges at the side of the crown which act as guides for fusible ropes, which are fixed in the following way: at one end, to a common lug, in the middle, kept off by a guide mounted on the spindle, and at the other end, to individual turnbuckles which enable the links of the chain to be fastened to the crown at different angles. Thus, as the line is lowered down to its sag level, the chain around the crown tends to spread and push away from the crown, first of all, the links on the topmost side of the sag. Thus, when the last fusible rope bursts, the line will be practically at its sag level end any sliding or slipping of the laying device will not harm the platform or the winch in any way.

However, in spite of the improved laying device referred to above being extremely efficient, a laying device which is less rugged but more in keeping with the kind of handling available on conventional style craft dealing with anchors is needed.

SUMMARY OF THE INVENTION

One of the purposes of this invention is therefore to provide a line laying device for use with platform mooring systems, consisting of a pair of claws, each with twin hooks, one claw swivelling on a spindle of the other claw, and which grip outside of a link by its ends, the one claw having the twin hooks joined where said one claw swivels on the spindle of the other claw and having a shoulder against which a spring-loaded lock operates. A small wheel is at the end of the lock, whose other end is fitted to the other claw by means of a spindle, such other claw also being fitted with a stop to limit travel of the lock and also having a ring to which wire rope to be dealt with is tied.

Other purposes, features, and advantages of this invention will be disclosed under the following detailed description when read together with the Figures attached hereto.

BRIEF DESCRIPTION OF THE DRAWINGS

FIG. 2 is a side view, in perspective, of the line laying device shown in FIG. 1.

DETAILED DESCRIPTION OF THE INVENTION

Figure 1:
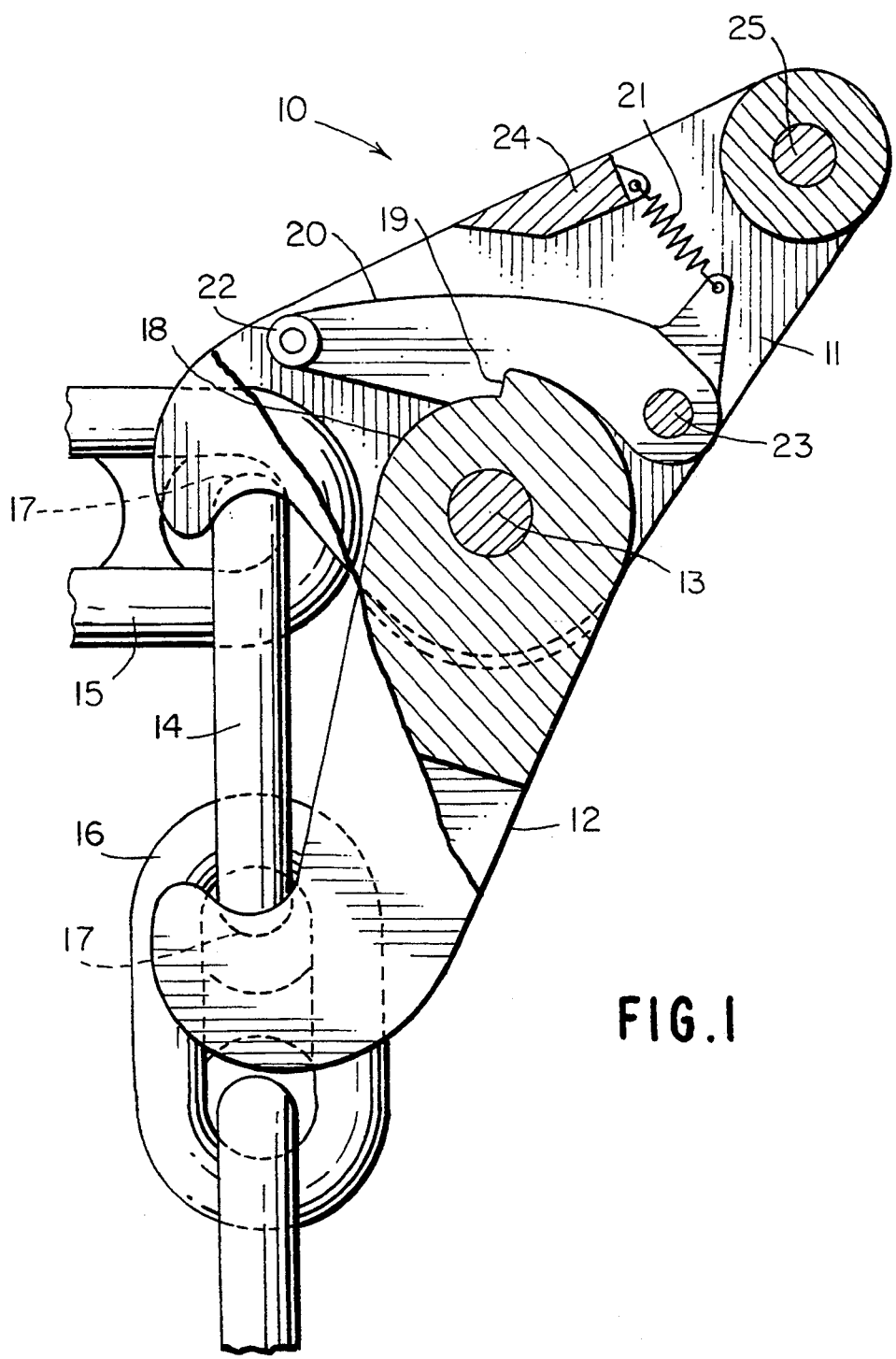
FIG. 1 is a front view of part of a section of the line laying device invented.

The invention consists of a line laying device made up of a pair of claws, 11, 12, each with twin hooks. Claw 12 swivels on a spindle, 13, of said claw 12 and is solid at part 18 of where it swivels on said spindle, 13, and being fitted with a shoulder, 19, against which a lock, 20, is biased by a spring, 21. Said lock, 20, is fitted with a small wheel, 22, at one end, and is pivotally mounted on said claw, 11, by means of spindle, 23. Such claw, 11, is also fitted with a stop, 24, to limit travel of said lock, 20, and with ring, 25, to which the wire rope to be dealt with is tied.

The line laying device employed for the mooring of platforms, generally referred to by the number 10, consists of a pair of claws, 11 and 12, each with twin hooks. Claw 12 swivels on a spindle, 13, of claw 11 and which hooks grip the outside of link 14, by its ends. Claws 11 and 12 are such that forward link 15 and the next link 16, following upon link 14 of the chain, lie in the space between the hooks of said pair of claws 11, 12 and are free to turn about parts 17, the ends of link 14.

Claw 12 is solid at part 18, where it swivels on spindle 13, and has a shoulder, 19, against which lock 20 operates, biased by spring, 21. The lock has a small wheel, 22, at one end, and a second end is pivotally mounted on claw 11 by means of spindle 23. Claw 11 also has a stop, 24, to limit the travel of lock 20, and a ring, 25, to which the wire rope to be dealt with is tied.

This invention also covers a method to operate the line laying device, 10, steps of which are as follows:

to operate line laying device, fasten wire rope 30 to a winch on the craft and to the line laying device by means of ring, 25, and put said line laying device 10, on to link 14 of a chain, between one end secured to the deck of a surface vessel 32 on the surface of the body of water 34 and the end of the claim;

lock, 20, biased by spring, 21, fits automatically against shoulder, 19, when claws, 11, 12, close on link 14;

pull mooring line, after fastening, by means of laying device, 10, thereby releasing the lock and enabling lowering operation to begin, and go on down to its sag level;

claws 11, 12, close around link 14, when lowering, due to forces arising out of weight acting upon claw 12 and pull exerted by supporting wire rope through ring 25;

laying device, 10, unlocks, because chain ceases to fall vertically, after having first of all hung from the laying device, 10, together with the wire rope, now adjusting itself to the sag (of the chain), while link 15 turns about upper part 17 of link 14, until it contacts the small wheel, 22, of lock, 20;

lock 20 lifts as link 15 continues to turn, and releases itself from shoulder, 19, until it gets to shoulder 24, whereupon unlocking is complete; and claw 11 which had been pulled by link 15, lifts and chain is released, after sag level has been reached, because of transfer of weight of travelling rope upon link, 15, to the platform, thereby relieving ring 25 from its holding task.

As is to be seen from FIG. 2, link 15 lies on the side of the chain coming from the platform, and link 16 lies on the side to the end of which the line laid beforehand is fastened. The chain coming from the platform is held on the deck of the craft, a certain number of links (tail end) are left free, after the place where it is held down, for the purpose of fastening to the line laid beforehand.

To work the laying device, 10, it is fastened to the wire rope of a winch on the craft, by means of ring, 25, and put on to a link, 14, of the chain, lying between the lock on the deck and such free end. When claws 11 and 12 close upon link 14 (FIG. 1), lock 20 biased by spring 21 fits automatically against shoulder, 19, thereby preventing claws 11 and 12 from accidentally opening up. When the mooring line has been fastened, it is pulled, for which laying device, 10, is used, and so as to bring about release of the locks that hold it to the deck, and work towards lowering it goes on until it gets down to its sag level.

During such lowering, the weight acting upon claw 12 and the pull exerted by the holding rope that runs through ring 25, create forces that tend to close claws 11 and 12 about link 14, thereby reducing force acting upon lock 20, which happens all the more as weight held up by the device, 10, acting on claw 11, is gradually transferred to the platform, as line sinks lower. Unlocking occurs when the chain, which was originally hanging from device, 10, along with wire rope, starts to shift away from its vertical position, in following the sag (of chain), and link 15 turns about upper part 17 of link 14, until it gets to the small wheel, 22, of lock 20. Thereafter, further turning of link 15 serves to lift up lock 20, releasing it from shoulder 19 until it gets to stop 24, and unlocking is completed.

As lowering continues, link 15 begins to press against stop 24, and tends to lift up (open) claw 11, in which it is prevented by the weight that acts upon claw 12 and the holding force exerted by device 10, at ring 25. Upon getting down to sag level, the weight of the chain acting upon link 16 is transferred to the platform, thus relieving the holding force at ring 25 and therefore enabling claw 11, which had been pulled by link 15, to lift up and release the chain.

I claim:

1. A method of operating a line laying device used for a platform mooring system wherein the device is comprised of a pair of claws each having twin hooks and pivotally coupled to a first spindle for swiveling about said first spindle, said twin hooks of one of said claws being joined to define a solid part where said one of said claws swivels on said first spindle, a radial shoulder on said solid part, a lock pivoted on a second spindle on another of said claws, biasing means biasing said lock against said shoulder, said lock being provided with a small wheel at an end remote from said second spindle on said another of said claws by means of a third spindle and said another of said claws being fitted with a stop to limit travel of said pivoted lock away from said shoulder and a ring carried by said another of said claws to which a wire rope may be secured;

said method comprising the steps of:

engaging a link of a chain at opposite ends of the link by each of said claws of said device with each adjacent link of said chain being disposed between the twin hooks of each claw respectively, thereby allowing said biasing means to pivot said lock into engagement with said shoulder to prevent disengagement of said claws from said link;

securing a wire rope about said ring of said device;

securing one end of said chain to a surface support; and lowering said chain and device into a body of water by means of said wire rope secured to said device;

whereby when said device reaches a level where said chain is substantially vertically extended, the adjacent link between said hooks of said claw having said lock thereon will pivot about the link engaged by said claws to engage and pivot said lock out of engagement with said shoulder to permit disengagement of said claws from said link by manipulation of said wire rope.

* * * * *